UNITED STATES PATENT OFFICE.

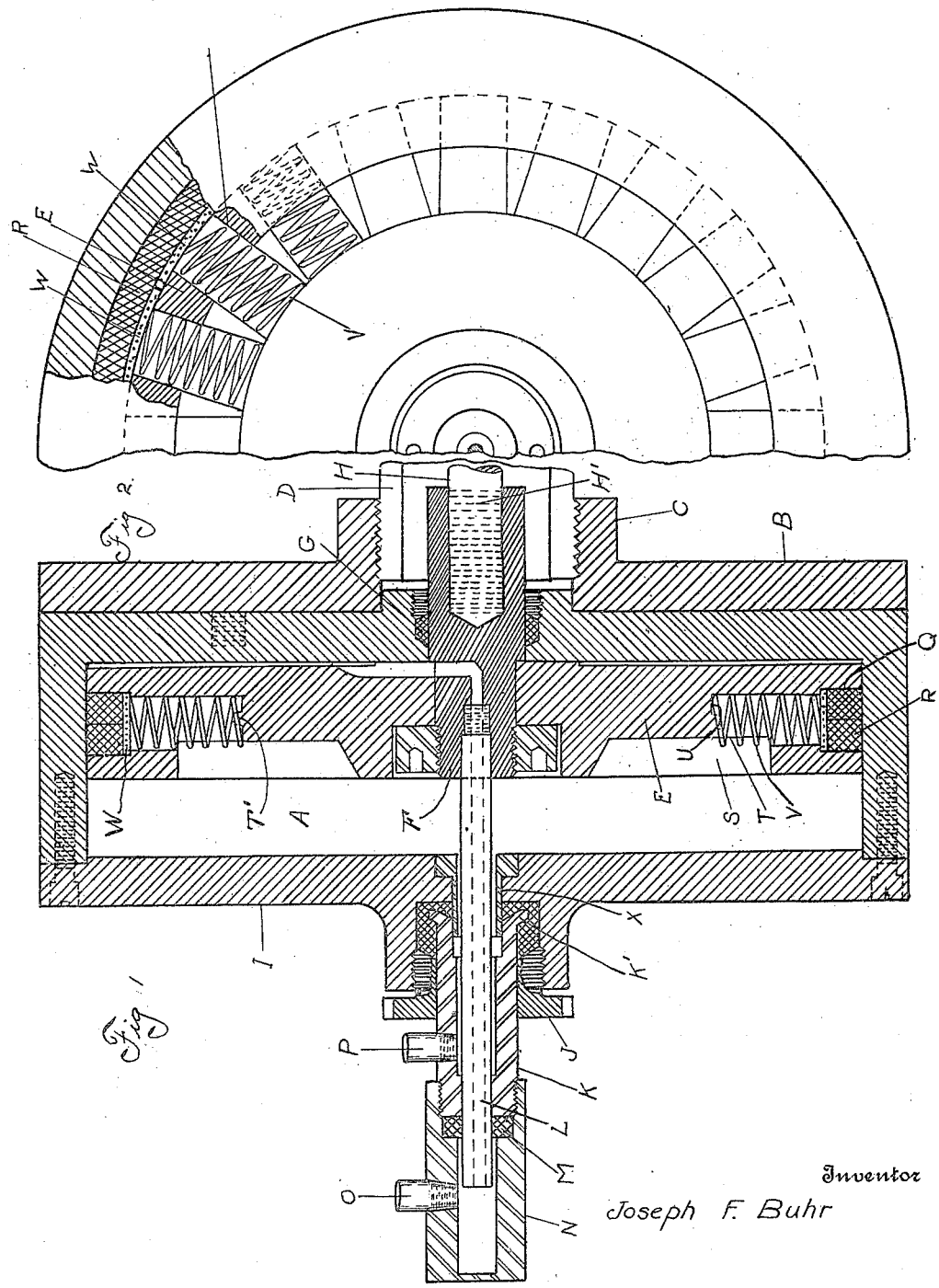

JOSEPH F. BUHR, OF DETROIT, MICHIGAN, ASSIGNOR TO DETROIT PNEUMATIC CHUCK COMPANY, OF FLAT ROCK, MICHIGAN, A CORPORATION OF MICHIGAN.

PNEUMATIC MOTOR.

1,377,745.  Specification of Letters Patent.  Patented May 10, 1921.

Application filed March 1, 1920. Serial No. 362,526.

*To all whom it may concern:*

Be it known that I, JOSEPH F. BUHR, a citizen of the United States of America, residing at Detroit, in the county of Wayne and State of Michigan, have invented certain new and useful Improvements in Pneumatic Motors, of which the following is a specification, reference being had therein to the accompanying drawings.

The invention relates to pneumatic motors designed for use in the operation of chucks for machine tools and more particularly for chucks mounted upon revoluble spindles. The invention consists in various features of constructions as hereinafter set forth.

In the drawings:

Figure 1 is a central longitudinal section through the motor, as mounted upon a revoluble hollow spindle;

Fig. 2 is a cross section.

A is a cylinder mounted upon a plate B having the threaded hub portion C for engagement with the threaded end of a hollow spindle D of a lathe or other tool. The cylinder A is arranged concentric with the axis of the spindle D and has arranged therewithin the piston E connected with a rod F passing out through a packing gland G into the hub C. H is a rod passing through the hollow spindle D and connected at its outer end with the chuck or other device to be operated by the motor, said rod having a threaded portion H' for engaging a correspondingly threaded socket in the rod F. I is a rear head for closing the cylinder A, provided with the packing gland J for engaging a non-revoluble tube K forming an air connection to the cylinder. Within the tube K is a concentrically arranged inner tube L, which is secured to the piston E and slidably engages a packing gland M between the outer end of the tube K and an alined hollow fitting N. O and P are air conduits connected, respectively, with the fitting N and with the tube K, the arrangement being such that the one will supply air through the inner tube L and piston E to the cylinder on the inner side of said piston, while the other will supply air for passing through the tube K to the cylinder on the outer side of the piston.

To provide an air tight joint between the piston and the cylinder, the former is provided with a peripheral groove Q in which is placed a suitable packing material R, preferably in the form of two strips of graphite impregnated fabric wound side by side in the groove, so as to break joints. It is essential that this packing should be maintained in firm contact with the walls of the cylinder at all points in the periphery and to this end the piston is so constructed as to permit of placing a series of radially extending springs resiliently bearing upon the packing. As shown, the piston has an annular recess S on its outer face which intersects with a series of radially arranged pockets T, the outer ends of which open into the peripheral groove Q, while the inner ends are formed with a seat U for engaging a coil spring V. The openings from the recess S into the pockets T are of sufficient area for the insertion of the springs V, which are compressed and then engaged with their rear ends against the seats or abutments U. When thus arranged, the springs will place a resilient tension upon the packing material R, forcing it outward against the wall of the cylinder. To uniformly distribute the pressure, segmental plates W are arranged within the groove Q opposite each of the pockets T, these plates taking the direct thrust of the springs in carrying the pressure into the packing.

In operation, the motor being mounted upon the revoluble hollow spindle D, the air conduits O and P are connected with a suitable controlling valve or valves (not shown), by which said conduits may be alternately supplied with compressed air or opened to exhaust. Thus whenever air is admitted through the conduit P, it will pass through the tube K into the outer end of the cylinder, where operating against the end of the piston it will force the same forward, actuating the rod H which transmits the movement to the chuck or other device to be actuated. The reverse movement is effected by supplying compressed air to the conduit O and opening the conduit P to exhaust, whereupon the air will pass through the inner tube L through the piston to the opposite side thereof. This will move the piston outward, inserting a pull upon the rod H. The operation will be the same whether the spindle B is revolving or is stationary, and as both the motor and the tubes K and L are arranged concentric with the axis of the spindle, the former is free to revolve at any time, while the tubes are non-revoluble. Also, the inner tube L is free to move telescopically within the fitting N during the longitudinal movement of the piston.

To maintain an air tight joint in the packing gland J, the inner end of the tube K is preferably provided with a flaring portion K' for bearing against the packing, and a bushing X telescopically engages the inner portion of the tube K, said bushing being spaced from the tube L so as to provide an air passage therebetween.

An important feature of the invention is the construction of the piston and the arrangement of the pockets therein for receiving the springs. Thus, instead of boring the pockets T, they are cored into the original casting and the cords therefor join with the annular core forming the recess S. Pintles T' at the inner ends of the pockets are formed by recesses in the cores and these pintles serve to hold the springs V from displacement. Therefore, the only machining required is the coring of the piston for the plunger and the machining of the periphery and grooves therein. This makes a cheap construction to manufacture and one with which the springs may be quickly assembled.

What I claim as my invention is:

1. In a pneumatic motor, the combination with a cylinder, a piston within said cylinder having a peripheral groove therein, and a series of radially extending cored pockets communicating with said groove, the inner ends of said pockets being also in communication with an annular recess in one side of said piston, packing material within said groove, and springs insertible into said pockets through said annular recess having one end thereof abutting against the inner end of the pocket and the outer end exerting a resilient tension against said packing.

2. In a pneumatic motor, the combination with a cylinder, of a piston therein provided with a peripheral groove and with a series of radially extending cored pockets in communcation with said groove and with an annular recess in one side of said piston, each of said pockets having a pintle formed at the inner end thereof, packing material within said peripheral groove, and springs insertible through said annular recess into said radial pockets, the inner ends of said springs abutting against the inner ends of the pockets and held from lateral displacement by said pintles and the outer ends of said springs exerting a resilient tension against said packing.

3. In a pneumatic motor, the combination with a cylinder, of a piston therein having a peripheral groove and a series of radially extending cored pockets communicating with said groove and at their inner ends with an annular recess in one side of said piston, segmental follower plates within said groove registering with the respective radial pockets, packing material in the form of two fabric strips placed side by side in said groove with break joints and springs insertible into said pockets through said annular recess and exerting a resilient pressure against said packing.

In testimony whereof I affix my signature.

JOSEPH F. BUHR.